United States Patent
Floyd et al.

(10) Patent No.: US 6,543,003 B1
(45) Date of Patent: Apr. 1, 2003

(54) METHOD AND APPARATUS FOR MULTI-STAGE HANG RECOVERY IN AN OUT-OF-ORDER MICROPROCESSOR

(75) Inventors: Michael Stephen Floyd, Leander, TX (US); James Allan Kahle, Austin, TX (US); Hung Qui Le, Austin, TX (US); Larry Scott Leitner, Austin, TX (US); Kevin Franklin Reick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,106

(22) Filed: Nov. 8, 1999

(51) Int. Cl.[7] ............................................. G06F 11/00
(52) U.S. Cl. ......................... 714/10; 714/48; 712/244; 712/219
(58) Field of Search ................. 714/10, 47, 48, 714/25, 30, 31, 51, 55, 38; 712/244, 228, 237–240, 235, 219

(56) References Cited

U.S. PATENT DOCUMENTS

| | | | | |
|---|---|---|---|---|
| 3,566,368 A | * | 2/1971 | DeBlauw | 714/51 |
| 4,872,110 A | * | 10/1989 | Smith et al. | 714/55 |
| 5,119,483 A | * | 6/1992 | Madden et al. | 707/9 |
| 5,136,696 A | * | 8/1992 | Beckwith et al. | 712/240 |
| 5,513,319 A | * | 4/1996 | Finch et al. | 714/55 |
| 6,000,040 A | * | 12/1999 | Culley et al. | 714/31 |
| 6,067,644 A | * | 5/2000 | Levine et al. | 712/227 |
| 6,128,687 A | * | 10/2000 | Dao et al. | 370/382 |
| 6,209,081 B1 | * | 3/2001 | Kahle et al. | 712/215 |
| 6,295,601 B1 | * | 9/2001 | Steele, Jr. | 712/244 |
| 6,393,590 B1 | * | 5/2002 | Wood et al. | 710/104 |

OTHER PUBLICATIONS

IBM Technical Discosure Bulletin. Processor Reset Control for Hardware Verification. Apr. 1994, vol. 37, Issue No. 4B, pp. 679–680.*

Taechashong, Primas and Prabhas Chongstitvatana. A VLSI Design of a Load/Store Unit for a RISC Processor. Proc. 2nd Annual National Symposium on Computational Science and Engineering, Bangkok, 1998, pp. 244–248.*

* cited by examiner

Primary Examiner—Robert Beausoliel
Assistant Examiner—Yolanda Wilson
(74) Attorney, Agent, or Firm—Duke W. Yee; Volel Emile; Stephen R. Tkacs

(57) ABSTRACT

A method and apparatus for recovering from a hang condition in a processor having a plurality of execution units. Monitoring is performed to detect a hang condition. Responsive to detecting a hang condition, instructions dispatched to the plurality of execution units are flushed.

44 Claims, 4 Drawing Sheets

METHOD AND APPARATUS FOR MULTI-STAGE HANG RECOVERY IN AN OUT-OF-ORDER MICROPROCESSOR

CROSS-REFERENCE TO RELATED APPLICATIONS

The present invention is related to the following application entitled "METHOD AND APPARATUS FOR HARVESTING PROBLEMATIC CODE SECTIONS AGGRAVATING HARDWARE DESIGN FLAWS IN A MICROPROCESSOR", U.S. application Ser. No. 09/436,104, filed even date hereof and assigned to the same assignee.

BACKGROUND OF THE INVENTION

1. Technical Field

The present invention relates generally to an improved data processing system and in particular to a method and apparatus for recovery from errors in the data processing system. Still more particularly, the present invention relates generally to an improved method and apparatus for recovering from errors occurring in a microprocessor in a data processing system.

2. Description of Related Art

Modern processors commonly use a technique known as pipelining to improve performance. Pipelining is an instruction execution technique that is analogous to an assembly line. Consider that instruction execution often involves the sequential steps of fetching the instruction from memory, decoding the instruction into its respective operation and operand(s), fetching the operands of the instruction, applying the decoded operation on the operands (herein simply referred to as "executing" the instruction), and storing the result back in memory or in a register. Pipelining is a technique wherein the sequential steps of the execution process are overlapped for a subsequence of the instructions. For example, while the CPU is storing the results of a first instruction of an instruction sequence, the CPU simultaneously executes the second instruction of the sequence, fetches the operands of the third instruction of the sequence, decodes the fourth instruction of the sequence, and fetches the fifth instruction of the sequence. Pipelining can thus decrease the execution time for a sequence of instructions.

Another technique for improving performance involves executing two or more instructions in parallel, i.e., simultaneously. Processors that utilize this technique are generally referred to as superscalar processors. Such processors may incorporate an additional technique in which a sequence of instructions may be executed out of order. Results for such instructions must be reassembled upon instruction completion such that the sequential program order or results are maintained. This system is referred to as out of order issue with in-order completion.

The ability of a superscalar processor to execute two or more instructions simultaneously depends upon the particular instructions being executed. Likewise, the flexibility in issuing or completing instructions out-of-order can depend on the particular instructions to be issued or completed. There are three types of such instruction dependencies, which are referred to as: resource conflicts, procedural dependencies, and data dependencies. Resource conflicts occur when two instructions executing in parallel tend to access the same resource, e.g., the system bus. Data dependencies occur when the completion of a first instruction changes the value stored in a register or memory, which is later accessed by a later completed second instruction.

During execution of instructions, an instruction sequence may fail to execute properly or to yield the correct results for a number of different reasons. For example, a failure may occur when a certain event or sequence of events occurs in a manner not expected by the designer. Further, an error also may be caused by a misdesigned circuit or logic equation. Due to the complexity of designing an out of order processor, the processor design may logically miss-process one instruction in combination with another instruction, causing an error. In some cases, a selected frequency, voltage, or type of noise may cause an error in execution because of a circuit not behaving as designed. Errors such as these often cause the scheduler in the microprocessor to "hang", resulting in execution of instructions coming to a halt.

Therefore, it would be advantageous to have a method and apparatus for recovering from errors causing a microprocessor to hang.

SUMMARY OF THE INVENTION

The present invention provides a method and apparatus for recovering from a hang condition in a processor having a plurality of execution units. Monitoring is performed to detect a hang condition. Responsive to detecting a hang condition, instructions dispatched to the plurality of execution units are flushed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
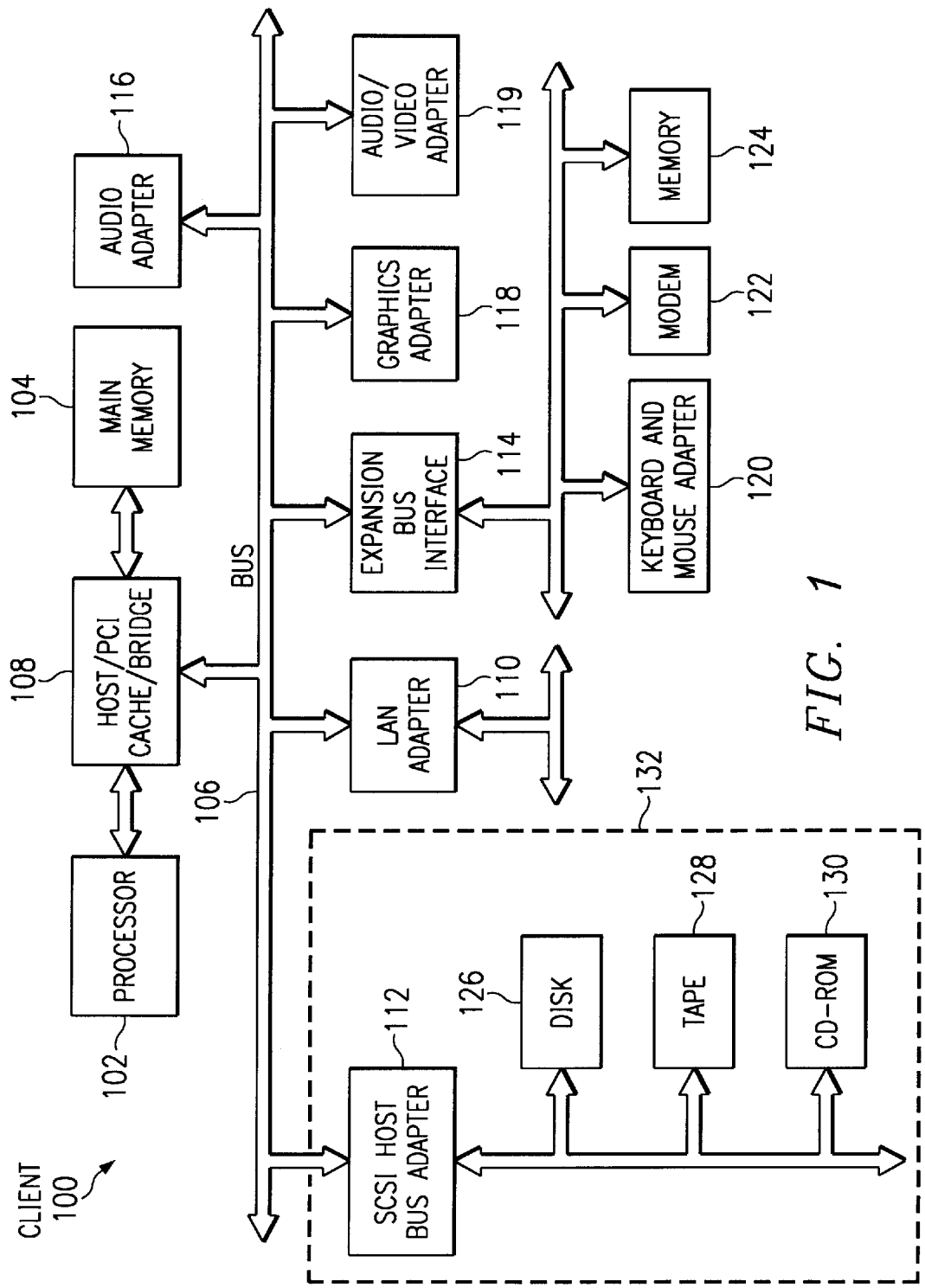
FIG. 1 is a block diagram of a data processing system in which the present invention may be implemented.

With reference now to FIG. 1, a block diagram illustrates a data processing system in which the present invention may be implemented. Data processing system 100 is an example of a client computer. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. Small computer system interface (SCSI) host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as AIX, which is available from International Business Machines Corporation. Instructions for the operating system and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130, as noted by dotted line 132 in FIG. 1 denoting optional inclusion. The data processing system depicted in FIG. 1 may be, for example, an IBM RISC/System 6000 system, a product of International Business Machines Corporation in Armonk, New York, running the Advanced Interactive Executive (AIX) operating system.

The depicted example in FIG. 1 and above-described examples are not meant to imply architectural limitations.

The present invention provides a method and apparatus for handling flaws that hang the instruction sequencing or instruction execution within a processor core. The present invention provides a mechanism having hooks or connections into the core to flush the currently processed instruction stream. When a flush occurs, instructions currently being processed by execution units are cancelled or thrown away. In other words, "flush" means to "cancel" or throw away the effect of the instruction being executed. Then, execution of the instructions are restarted. The flush operation may be implemented by using currently available flush mechanisms for processor cores currently implemented to back out of mispredicted branch paths. The present invention recognizes that during certain windows of time, a particular instruction sequence may fail. If this stream of instructions is flushed and re-executed, the sequence may execute flawlessly on the second attempt.

Further, during the hang recovery process, the behavior of a processor may be changed in accordance with a preferred embodiment of the present invention. For example, the mechanism of the present invention may change the processor from executing instructions out of order to executing instructions in order, also referred to as a "single issue" mode. Also, the processor may be changed to process one instruction per group of execution means. In this case, the processor no longer operates in a superscaler mode. A further mode of operation may include flushing and re-fetching after every group of instructions to slow down instruction throughput. Re-executing the code sequence with a different execution order for the group as it flows through the processor may allow the code stream to execute flawlessly on the second attempt. These behavior changes effectively reduce the performance or throughput of the processor in an attempt to avoid the exact instruction timing that exposes the flaw causing the processor to hang. After a programmable number of instruction/group completions, the processor may be returned back to full-speed operation for performance.

In particular, the mechanism of the present invention may be implemented within processor 102. Specifically, the mechanism of the present invention is particularly suited for use in a superscaler processor.

Figure 2:
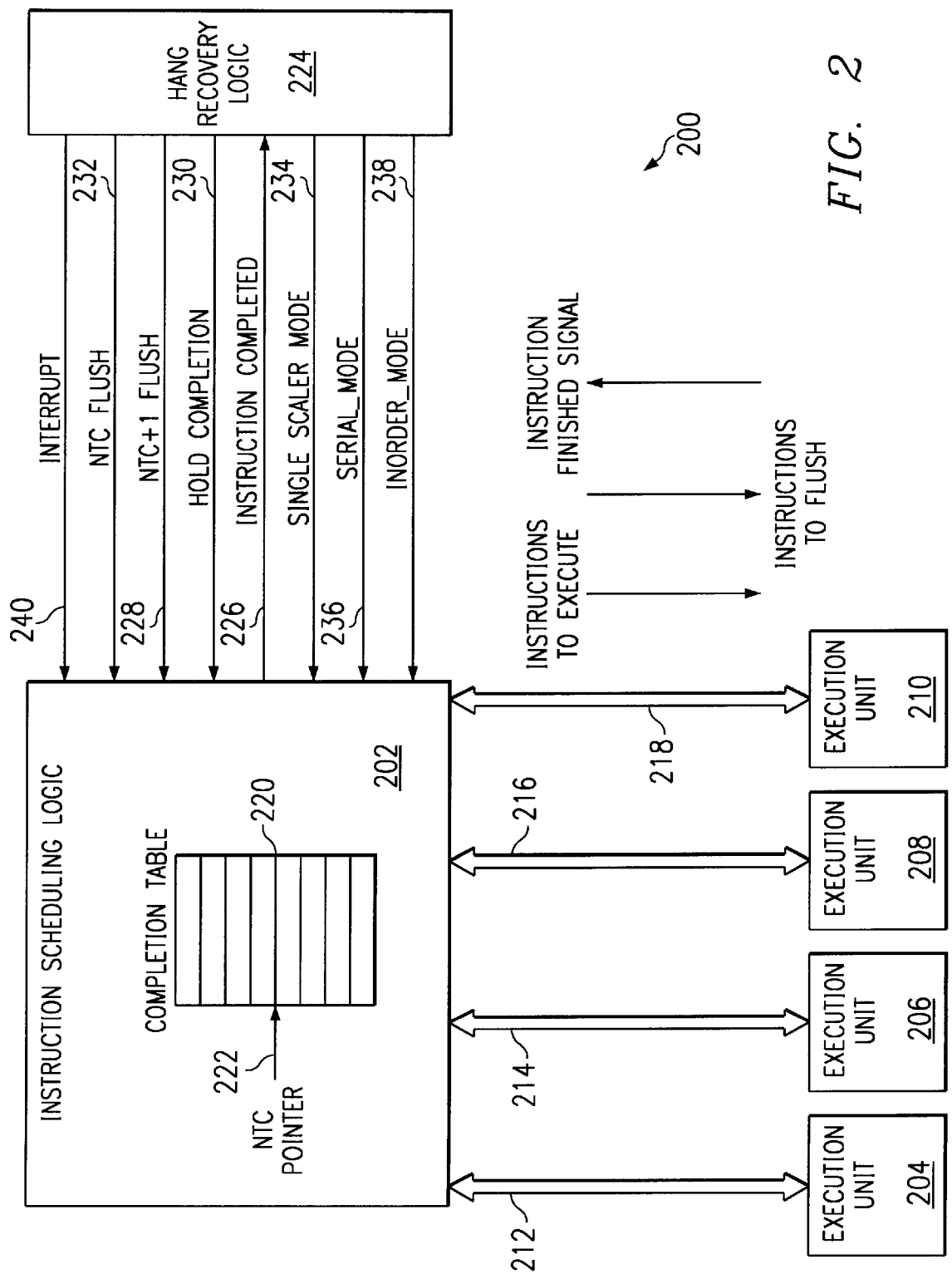
FIG. 2 is a diagram of a portion of a processor core depicted in accordance with a preferred embodiment of the present invention.

With reference next to FIG. 2, a diagram of a portion of a processor core is depicted in accordance with a preferred embodiment of the present invention. Section 200 illustrates a portion of a processor core for a processor, such as processor 102 in FIG. 1. Only the components needed to illustrate the present invention are shown in section 200. Other components are omitted in order to avoid obscuring the invention.

In section 200, instruction scheduling logic 202 schedules and dispatches instructions to execution units 204–210. Instruction scheduling logic 202 may also be referred to as an instruction dispatcher. Execution units 204–210 include execution units, such as fixed point units (FXUs), floating point units (FPUs), and load/store units (LSUs). Of course, these execution units may include other types of execution units depending on the implementation. Only four execution units are shown for the purpose of illustration and other numbers of execution units may be present. Further, multiple execution units of the types mentioned are present for superscaler processing.

Instruction scheduling logic 202 communicates with execution units 204–210. In general, instruction scheduling logic 202 is able to send instructions to an execution unit or commands to flush instructions present in that execution unit via bus 212–218. In response, an execution unit may return an instruction finished signal to indicate when an execution of an instruction has been completed. Completion of execution of these instructions are tracked by instruction scheduling logic 202 in completion table 220 using next to complete (NTC) pointer 222. This pointer points to the instruction that is next to be completed.

Hang recovery logic 224 is coupled to instruction scheduling logic 202 to provide a hang recovery mechanism. Hang recovery logic 224 receives signals indicating instruction completion through line 226. Instruction scheduling logic 222 will send an instruction completion signal each time an instruction has completed. This signal is used by hang recovery logic 224 to determine whether a hang situation has occurred. If instruction scheduling logic 202 hangs, various signals may be sent to provide hang recovery. The hang of the processor core is sometimes located in the instruction scheduling logic and other times may be in the execution unit itself. When the execution unit hangs, the instruction scheduling logic fails to receive an instruction finish signal from the execution unit, and thus the instruction scheduling logic stops making forward progress in issuing or completing instructions.

In this example, a NTC+1 flush signal may be sent on line 228 as a low priority flush attempt in response to a hang condition in the processor core. A NTC flush signal may be sent on line 232 to perform a high priority flush attempt if the first hang recovery attempt did not break the hang. A hold completion signal may be sent on line 230 to instruction scheduling logic 202. In some implementations, it may be necessary to momentarily hold the dispatch of instructions and/or the completion of instructions during the flush operation in order to prevent confusing instruction scheduling logic 202. The hold completion signal stops completion of instructions during the flush operation.

The mode of processor performance may be changed using hand recovery logic 224. In these examples, the mode is changed through lines 234–238, which are used to implement a single scalar mode, a serial mode, and an in-order mode in these examples. Further, an interrupt may be generated across line 240 to allow software intervention to clean up the hang condition. This software recovery may include, for example, terminating the process that contained the problem code stream that caused the hang without crashing the entire system.

Figure 3:
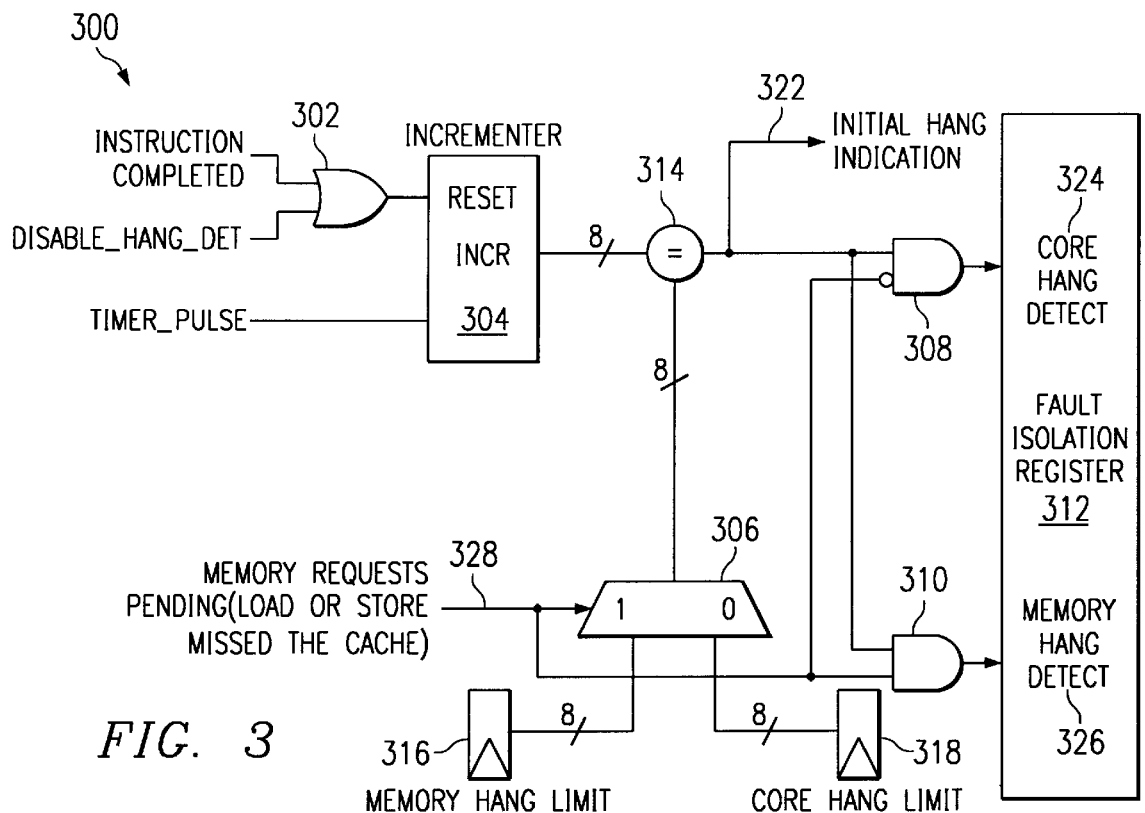
FIG. 3 is a block diagram of a core hang detect unit depicted in accordance with a preferred embodiment of the present invention.

With reference now to FIG. 3, a block diagram of a core hang detect unit is depicted in accordance with a preferred embodiment of the present invention. Core hang detect unit 300 is used to detect hang conditions and may be located in hang recovery logic 224 in FIG. 2. If a processor has not completed an instruction at the end of N timer pulses, core hang detect unit 300 will activate the core hang recovery logic. These timer pulses may be generated from a tunable source, such that hang core detect unit 300 is able to monitor for completion of instructions and indicate when an unacceptable amount of time has expired since the last instruction completion.

In this example, core hang detect unit 300 includes OR gate 302, incrementor 304, multiplexer 306, AND gate 308, and AND gate 310, fault isolation register 312, comparator 314, memory hang limit 316, and core hang limit 318. An instruction completed signal is received at OR gate 302. This instruction completed signal may be received from line 226 in FIG. 2. This signal is sent into incrementer 304 unless the function has been disabled by application of disable_hang_det signal to OR gate 302. Incrementer 304 increments each time a signal, such as timer_pulse is applied to incrementer 304. The count contained in incrementer 304 is reset each time a logic "1" signal is received from OR gate 302. Incrementer 304 sends a value to comparator 314. The value from incrementer 304 is compared with a value received from multiplexer 306. The value output by multiplexer 306 may be memory hang limit 316 or core hang limit 318. Different limits are set to account for conditions in which an instruction requires accessing memory. Such a situation often takes more time than just executing an instruction. This limit is selectable to avoid falsely indicating a hang condition when memory is being accessed. If memory request pending signal 328 is a logic "1", memory hang limit 316 is selected. In this example, a pending memory request may be present when a load or store misses the cache in the processor core. Core hang limit 318 is selected when memory request pending signal 328 is a logic "0".

If the output from multiplexer 306 equals that of incrementer 304, an initial hang indication 322 is generated. In addition, the signal is sent to AND gate 308 and AND gate 310. These AND gates generate core detect indication 324 and memory hang detect indication 326, respectively. The AND gates are selectively enabled and disabled by memory request pending signal 328, which also is used to select a limit using multiplexer 306.

Figure 4:
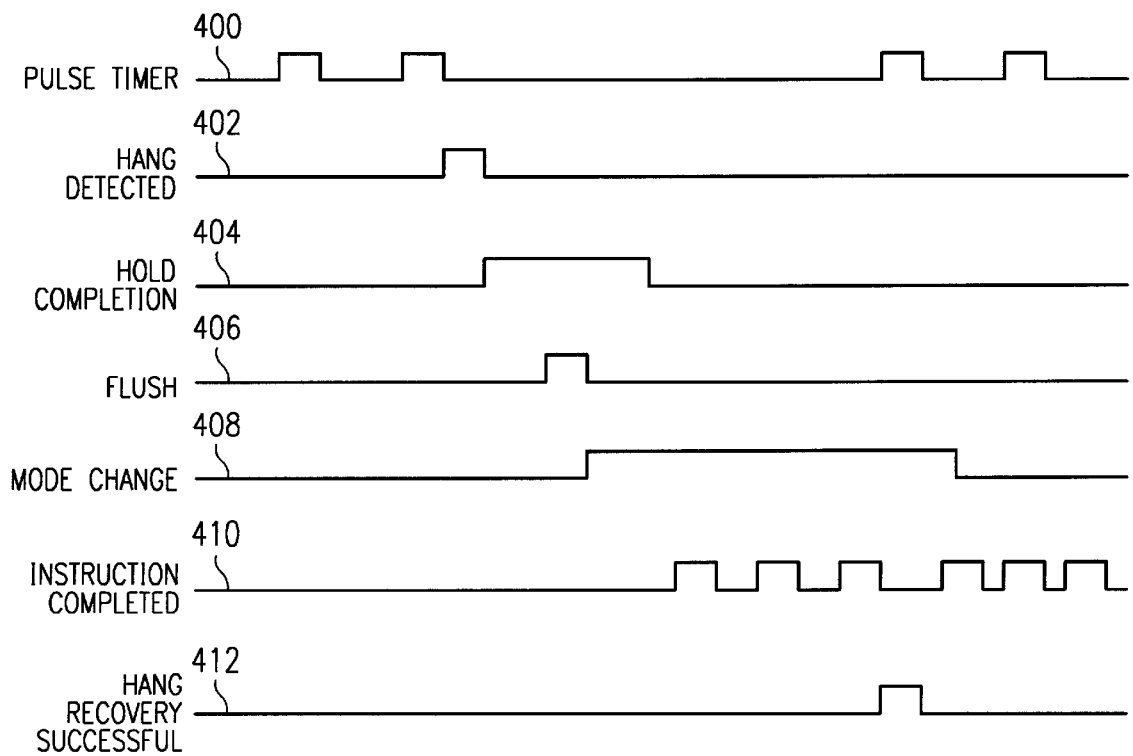
FIG. 4 is a timing diagram of a flush process depicted in accordance with a preferred embodiment of the present invention.

With reference now to FIG. 4, a timing diagram illustrating a flush process is depicted in accordance with a preferred embodiment of the present invention.

Pulse timer signal 400 illustrates the timer signal applied to incrementer 304 in FIG. 3. Hang detected signal 402 is a hang detect indication, such as core hang detect indication 324 or memory hand detect indication 326 in FIG. 3. A logic "1" in hang detected signal 402 indicates that a hang condition is present. Hold completion signal 404 is used to momentarily hold the dispatch of instructions and/or the completion of instructions during the flush operation in order to prevent confusing the instruction scheduling logic. This operation occurs when hold completion 404 is a logic "1". Hold completion signal 404 is communicated across line 230 in FIG. 2.

Flush signal 406 causes a flush process to occur when this signal is a logic "1". Flush signal 406 may be either a NTC flush or a NTC+1 flush depending on the situation. Mode change signal 408 is used to change the mode in which the processor executes instructions. This change in mode occurs when mode change signal 408 is a logic "1". In the depicted examples, three different types of mode changes may occur: a single scalar mode, a serial mode, and an in-order mode. The type of mode that occurs may be set by a mode bit within hang recovery logic 224 in FIG. 2. The signals are sent through lines 234–238 in FIG. 2.

Single scalar mode causes the processor core to issue a single instruction for execution during each cycle when mode change signal 408 is a logic "1". This signal is used to avoid some types of problematic dependencies between instructions that occur at time of issue. In the serial mode, the processor executes and completes an instruction before issuing the next instruction. This mode is necessary to remove dependencies that occur while executing instructions at the same time. In the in-order mode, multiple instructions may be sent for execution, but the instructions are dispatched in order. This mode is used to avoid problems that arise with out of order issue of instructions. These different mode signals also may be set by a mode bit within hang recovery logic 224 in FIG. 2.

Instructions completed signal 410 is a logic "1" each time an instruction is completed. Hang recovery successful signal 412 is a logic "1" when a successful hang recovery has occurred. This signal is used as an internal indication to perform various actions within the hang recovery logic. Specifically, mode change signal 408 will not change to a logic "0" to return the processor to a normal mode until a successful hang recovery has occurred, as indicated by hang recovery successful signal 412. These actions are described in more detail below.

In the depicted examples, pulse timer signal 400 actually occurs at regular time intervals. A longer interval between pulses is present in order to illustrate other signals occuring between pulses in pulse timer signal 400. In other words, a change in scale is illustrated, rather than a change in the time between pulses in pulse timer signal 400. In these examples, hang recovery successful signal 412 occurs after a programmable number of bits have been successfully completed, as indicated by instruction completed signal 410. Although only a few timer pulses are shown before hang detected signal 402 generates a logic "1", many cycles may occur in actuality. Further, the number of instruction completed in the different modes may occur over many instruction completions depending on the implementation.

Figure 5:
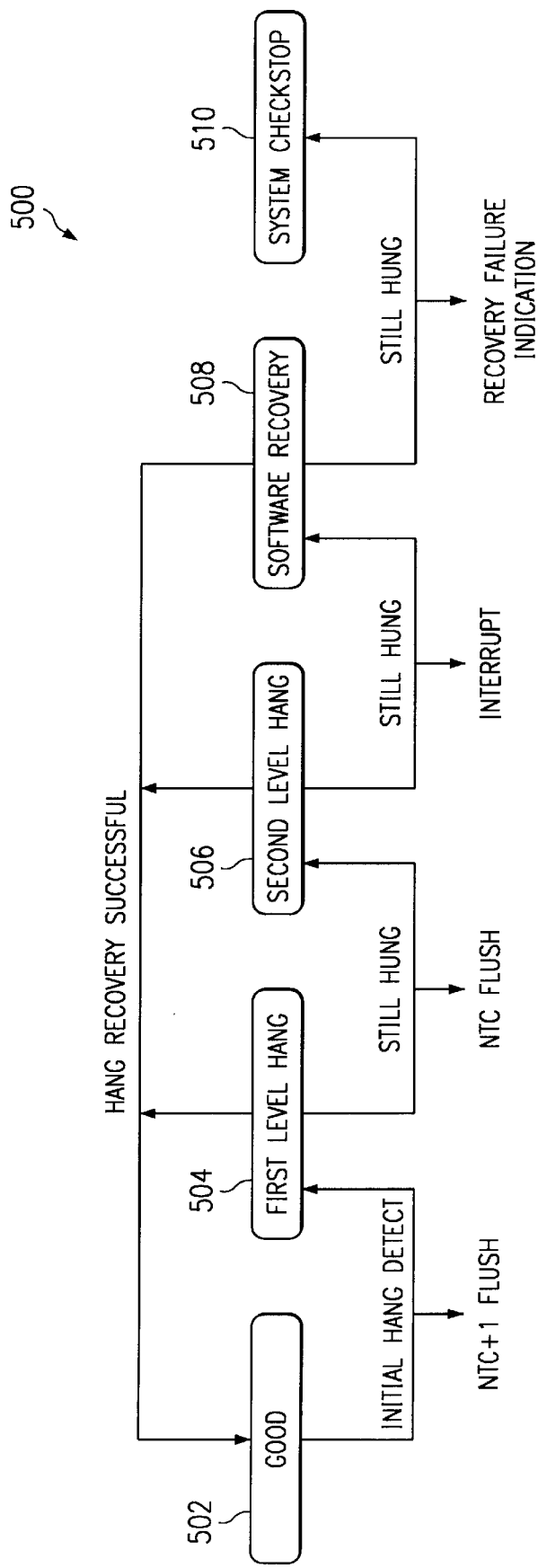
FIG. 5 is a state machine for a hang recovery logic unit depicted in accordance with a preferred embodiment of the present invention.

With reference now to FIG. 5, a state machine for a hang recovery logic unit is depicted in accordance with a preferred embodiment of the present invention. Once a processor hang has been detected, a flush (which causes an instruction cancel and refetch) may be attempted to clear the hang. Two levels of flushing are present in the present invention and implemented in state machine 500. The first level is also referred to as a low priority flush or a NTC+1. The second level, which is also called a high priority flush, is more aggressive and will flush the next to complete (NTC) group.

State machine 500 in this example begins in state 502, which indicates a good execution state. In this state, a hang condition has not been detected. In response to an initial hang detect, state machine 500 shifts to state 504, which is a first level hang state. In shifting to this state, a NTC+1 flush is sent to the instruction schedule logic. This mechanism is used to flush the next to complete group+1 (NTC+1). In other words, in NTC+1 all of the instructions behind the instruction that is trying to complete are flushed.

In the depicted examples, the processor is given a full hang limit duration in which to begin completing instructions again. In particular, a hang is considered recovered if a selected number of groups of instructions or instructions complete before the hang limit duration expires. If the hang condition goes away, as indicated by a hang recovery successful indication, state machine 500 returns to state 502. In returning to this state, the processor is returned to a normal processing mode if the mode was changed previously.

If a hang condition is still present, state machine 500 then shifts from state 504 to state 506, which is a second level hang state. In shifting to this state, a NTC flush is initiated. The NTC flush causes the instruction that is trying to complete to flush, as well as all of the instructions behind it. In other words, all of the instructions currently active in the processor are canceled in this case. The hang condition is considered recovered as described above.

If the hang condition clears, state machine 500 returns to state 502. The transition to state 502 is caused by a hang recovery successful indication. If a programmable number of instructions have completed since the transition to the state, then the hang has been successfully recovered from and a transition back to state 502 may occur. Upon transition back to state 502, the system is placed back into a full performance mode. If the programmable number of instructions have not completed and another timer pulse occurs, the system is still considered in a hang state.

On the other hand, if the hang condition persists, state machine 500 shifts to state 508, which is a software recovery state. In shifting to this state, an interrupt is produced to allow software intervention to clean up the hang condition. This software recovery may include, for example, terminating the process that contained the problem code stream that caused the hang without crashing the entire system. If the hang condition is cleared, the state machine returns to state 502. Otherwise, if the hang condition is still present, state machine 500 shifts to state 510, indicating that the hang recovery has failed, which is a system check stop state. In some cases the flushes may not be able to break the hang condition, but an interrupt may be able to break this condition and allow some form of software recovery.

Depending on the implementation, instead of shifting to state 506 from state 504, state machine 500 may shift directly to state 508 or state 510. Alternatively, a signal may be sent to request assistance from an external service processor in any of these states. In some cases the instruction scheduling logic is unable to perform a flush without corrupting the architected state of the processor. In such cases, the flush operation may be ignored by the instruction scheduling unit. In other implementations, the instructions scheduling unit may communicate to the hang recovery unit indicating when it is safe or not safe to perform the flush operations.

Thus, the present invention provides a method and apparatus for recovering from hang conditions in a processor. In particular, the mechanism of the present invention initiates a flush of the instructions being processed within the processor core. This flush causes instructions to be cancelled. The cancelled instructions may include instructions prior to the current instruction being processed, or include all of the instructions active in the processor. The hang recovery logic may place the processor in a reduced performance mode, or the second time the instructions are executed, a different sequence of events may occur, such as when cache hits occur. In this manner, conditions causing execution errors may be absent the next time the instructions are executed.

The description of the present invention has been presented for purposes of illustration and description, but is not intended to be exhaustive or limited to the invention in the form disclosed. Many modifications and variations will be apparent to those of ordinary skill in the art. For example, although the examples used individual instructions to base decisions on whether hang states exist or whether a successful hang recovery has occurred, the present invention may be applied to groups of instructions, including flushing groups of instructions. The embodiment was chosen and described in order to best explain the principles of the invention the practical application and to enable others of ordinary skill in the art to understand the invention for various embodiments with various modifications as are suited to the particular use contemplated.

What is claimed is:

1. A method for recovering from a hang condition in a processor having a plurality of execution units, the method comprising:

monitoring for a hang condition, wherein the hang condition is characterized by expiration of a period of time before receiving, from instruction scheduling logic, an indication of completion of execution of an instruction by the plurality of execution units; and responsive to detecting a hang condition, flushing instructions dispatched to the plurality of execution units.

2. The method of claim 1, wherein the plurality of execution units includes a floating unit.

3. The method of claim 1, wherein the plurality of execution units includes a fixed point unit.

4. The method of claim 1, wherein the plurality of execution units includes a load/store unit.

5. The method of claim 1, wherein the step of monitoring for a hang condition comprises:

determining whether a selected period of time has passed without an instruction being completed by the plurality of execution units.

6. The method of claim 1, wherein the flushing step includes:

flushing all instructions behind an instruction being processed by an execution unit.

7. The method of claim 1, wherein the flushing step includes:

flushing all instructions dispatched to an execution unit.

8. A method for recovering from a hang condition in a processor having a plurality of execution units, the method comprising:

monitoring for a hang condition; and responsive to detecting a hang condition, flushing instructions dispatched to the plurality of execution units, wherein the flushing step comprises:
  flushing all instructions behind an instruction being processed by an execution unit;
  responsive to the flushing step, restarting execution of instructions;
  determining whether the hang condition is still present; and
  responsive to the hang condition still being present, flushing all instructions dispatched to an execution unit.

9. A method in a processor for recovering from a hang condition, the method comprising:
  monitoring for a period of time during which completion of execution of an instruction by a plurality of execution units is absent; and
  responsive to detecting the period of time, selectively canceling instructions dispatched to the plurality of execution units,
  wherein the period of time is a first time for processing of instructions in which access to a system memory is absent and wherein the period of time is a second time if the instruction requires access to the system memory.

10. The method of claim 9, wherein the selectively canceling step comprises:
  canceling all instructions preceding an instruction being processed by the plurality of execution units.

11. The method of claim 9 wherein the selectively canceling step comprises:
  canceling all instructions preceding an instruction being processed by the plurality of execution units and all instructions being processed by the plurality of execution units.

12. The method of claim 9, wherein the plurality of execution units includes a floating unit.

13. The method of claim 9, wherein the plurality of execution units includes a fixed point unit.

14. The method of claim 9, wherein the plurality of execution units includes a load/store unit.

15. The method of claim 9 further comprising:
  re-dispatching canceled instructions to the plurality of execution units in response to selectively canceling instructions.

16. A method in a processor for recovering from a hang condition, the method comprising:
  monitoring for a period of time during which completion of execution of an instruction by a plurality of execution units is absent; and
  responsive to detecting the period of time, selectively canceling instructions dispatched to the plurality of execution units,
  wherein the processor operates in a first performance mode and further comprising:
    altering the processor to operate in a second performance mode; and
    re-dispatching canceled instructions to the plurality of execution units in response to selectively canceling instructions after altering the processor.

17. The method of claim 16, wherein the first performance mode processes instructions in a superscalar and out of order fashion.

18. The method of claim 17, wherein the second performance mode processes instructions in a non-superscalar fashion.

19. The method of claim 17, wherein the second performance mode processes instructions in order.

20. A processor comprising:
  a plurality of execution units;
  a dispatcher connected to the plurality of execution units, wherein the dispatcher sends instructions to the plurality of execution units for processing; and
  a hang recovery unit connected to the dispatcher, wherein the hang recovery unit monitors for completion of instructions by the plurality of execution units, initiates a cancellation process to selectively cancel instructions sent to the plurality of execution units by the dispatcher in response to an absence of a completion in processing of instruction by the plurality of execution units within a period of time.

21. The processor of claim 20, wherein the dispatcher receives signals indicating completion of processing by the plurality of execution units, wherein the dispatcher sends a completion signal to the hang recovery unit each time an instruction is completed by the plurality of execution units, and wherein the hang recovery unit monitors for completion of instructions by waiting for the completion signal from the dispatcher.

22. The processor of claim 20 further comprising:
  a core hang detect unit, wherein the core hang detect unit is located in the hang recovery unit and indicates when the period of time has passed.

23. The processor of claim 22, wherein the period of time is a first value when access to an off chip memory is absent in processing an instruction and wherein the period of time is a second value when access to an off chip memory is required in processing the instruction.

24. An apparatus for recovering from a hang condition in a processor having a plurality of execution units, the apparatus comprising:
  monitoring means for monitoring for a hang condition, wherein the hang condition is characterized by expiration of a period of time before receiving, from instruction scheduling logic, an indication of completion of execution of an instruction by the plurality of execution units; and
  flushing means, responsive to detecting a hang condition, for flushing instructions dispatched to the plurality of execution units.

25. The apparatus of claim 24, wherein the plurality of execution units includes a floating unit.

26. The apparatus of claim 24, wherein the plurality of execution units includes a fixed point unit.

27. The apparatus of claim 24, wherein the plurality of execution units includes a load/store unit.

28. The apparatus of claim 24, wherein the means of monitoring for a hang condition comprises:
  determining means for determining whether a selected period of time has passed without an instruction being completed by the plurality of execution units.

29. The apparatus of claim 24, wherein the flushing means includes:
  flushing means for flushing all instructions behind an instruction being processed by an execution unit.

30. The apparatus of claim 24, wherein the flushing means includes:
  flushing means for flushing all instructions dispatched to an execution unit.

31. An apparatus for recovering from a hang condition in a processor having a plurality of execution units, the apparatus comprising:
  monitoring means for monitoring for a hang condition; and
  flushing means, responsive to detecting a hang condition, for flushing instructions dispatched to the plurality of execution units, wherein the flushing means comprises:
  flushing means for flushing all instructions behind an instruction being processed by an execution unit;
  restarting means, responsive to the flushing step, for restarting execution of instructions;
  determining means for determining whether the hang condition is still present; and
  flushing means, responsive to the hang condition still being present, for flushing all instructions dispatched to an execution unit.

32. An apparatus for recovering from a hang condition in a processor, the apparatus comprising:
  monitoring means for monitoring for a period of time during which completion of execution of an instruction by a plurality of execution units is absent; and
  canceling means, responsive to detecting the period of time, for selectively canceling instructions dispatched to the plurality of execution units,
  wherein the period of time is a first time for processing of instructions in which access to a system memory is absent and wherein the period of time is a second time if the instruction requires access to the system memory.

33. The apparatus of claim 32, wherein the canceling means for selectively canceling comprises:
  canceling means for canceling all instructions preceding an instruction being processed by the plurality of execution units.

34. The apparatus of claim 32 wherein the canceling means for selectively canceling comprises:
  canceling means for canceling all instructions preceding an instruction being processed by the plurality of execution units and all instructions being processed by the plurality of execution units.

35. The apparatus of claim 32, wherein the plurality of execution units includes a floating unit.

36. The apparatus of claim 32, wherein the plurality of execution units includes a fixed point unit.

37. The apparatus of claim 32, wherein the plurality of execution units includes a load/store unit.

38. The apparatus of claim 32 further comprising:
  re-dispatching means for re-dispatching canceled instructions to the plurality of execution units in response to selectively canceling instructions.

39. An apparatus for recovering from a hang condition in a processor, the apparatus comprising:
  monitoring means for monitoring for a period of time during which completion of execution of an instruction by a plurality of execution units is absent; and
  canceling means, responsive to detecting the period of time, for selectively canceling instructions dispatched to the plurality of execution units,
  wherein the processor operates in a first performance mode and further comprising:
    altering means for altering the processor to operate in a second performance mode; and
    re-dispatching means for re-dispatching canceled instructions to the plurality of execution units in response to selectively canceling instructions after altering the processor.

40. The apparatus of claim 39, wherein the first performance mode processes instructions in a superscalar and out of order fashion.

41. The apparatus of claim 40, wherein the second performance mode processes instructions in a non-superscalar fashion.

42. The apparatus of claim 40, wherein the second performance mode processes instructions in order.

43. A computer program product in a computer readable medium for recovering from a hang condition in a processor having a plurality of execution units, the computer program product comprising:
  first instructions for monitoring for a hang condition, wherein the hang condition is characterized by expiration of a period of time before receiving, from instruction scheduling logic, an indication of completion of execution of an instruction by the plurality of execution units; and
  second instructions, responsive to detecting a hang condition, for flushing instructions dispatched to the plurality of execution units.

44. A computer program product in a computer readable medium for recovering from a hang condition in a processor, the computer program product comprising:
  first instructions for monitoring for a period of time during which completion of execution of an instruction by a plurality of execution units is absent; and
  second instructions, responsive to detecting the period of time, for selectively canceling instructions dispatched to the plurality of execution units,
  wherein the period of time is a first time for processing of instructions in which access to a system memory is absent and wherein the period of time is a second time if the instruction requires access to the system memory.

* * * * *